United States Patent
Whitfield et al.

[11] 3,847,225
[45] Nov. 12, 1974

[54] PEANUT HARVESTER

[75] Inventors: Carroll J. Whitfield; Jack C. Whitesides, both of Columbus, Ga.

[73] Assignee: Kelley Manufacturing Co., Columbus, Ga.

[22] Filed: Nov. 16, 1972

[21] Appl. No.: 307,181

[52] U.S. Cl. ............................................. 171/101
[51] Int. Cl. ........................................... A01d 29/00
[58] Field of Search ...................... 171/101, 116, 44

[56] References Cited
UNITED STATES PATENTS

| | | | |
|---|---|---|---|
| 2,669,820 | 2/1954 | Falkner | 171/44 |
| 3,454,100 | 7/1969 | Lilley | 171/116 |
| 3,625,291 | 12/1971 | Paulk et al. | 171/101 |
| 3,726,345 | 4/1973 | Harrell et al. | 171/101 |

*Primary Examiner*—Antonio F. Guida
*Attorney, Agent, or Firm*—Jones, Thomas & Askew

[57] ABSTRACT

A peanut harvester movable along adjacent crop rows of peanut plants which simultaneously unearths the plants from the adjacent crop rows, elevates the plants above the ground as the harvester proceeds down the crop rows, shakes the dirt from the plants, and deposits the plants back on the ground with the foliage of the plants adjacent the ground and the roots and peanuts positioned on top of the plants in a wind row so as to be exposed to sun and air for drying. The harvester includes an upwardly inclined conveyor for elevating the plants and a plant inverter is positioned behind and below the upper end of the conveyor and includes a plurality of rearwardly extending guide bars and plant propelling drums of hyperboloid configuration with spokes radiating therefrom which extend through the guide bars and urge the plants along the length of the guide bars.

5 Claims, 4 Drawing Figures

PATENTED NOV 12 1974
3,847,225
SHEET 1 OF 2
FIG. 1
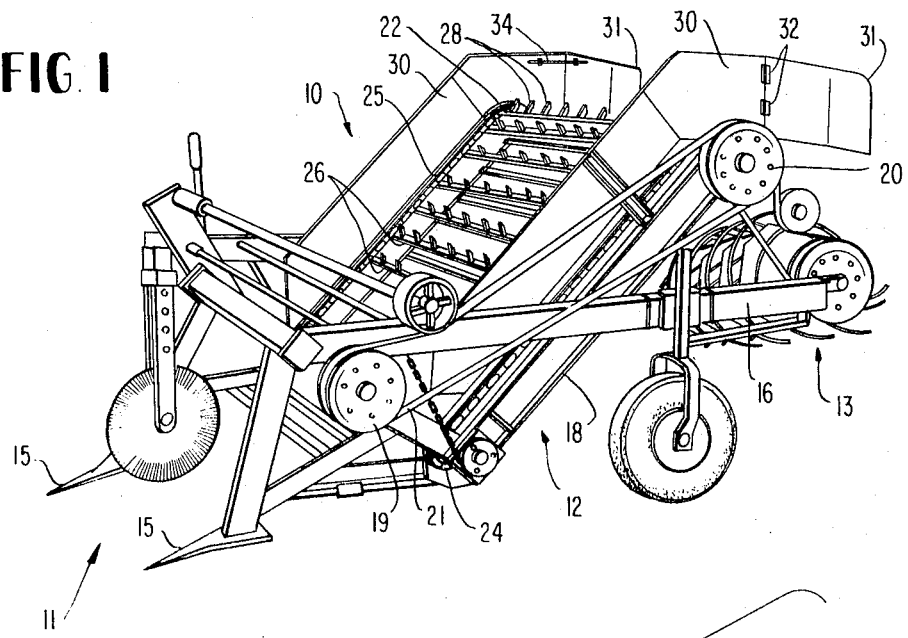
FIG. 3
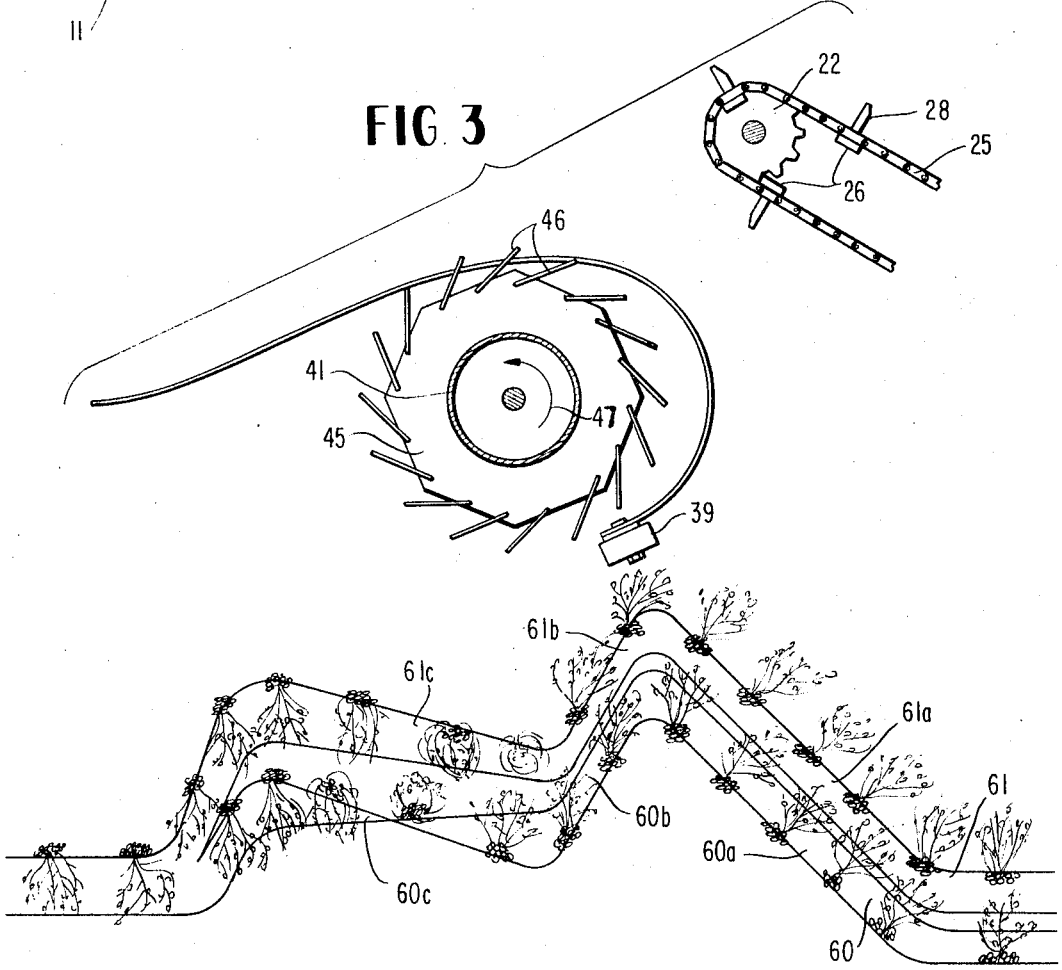
FIG. 4

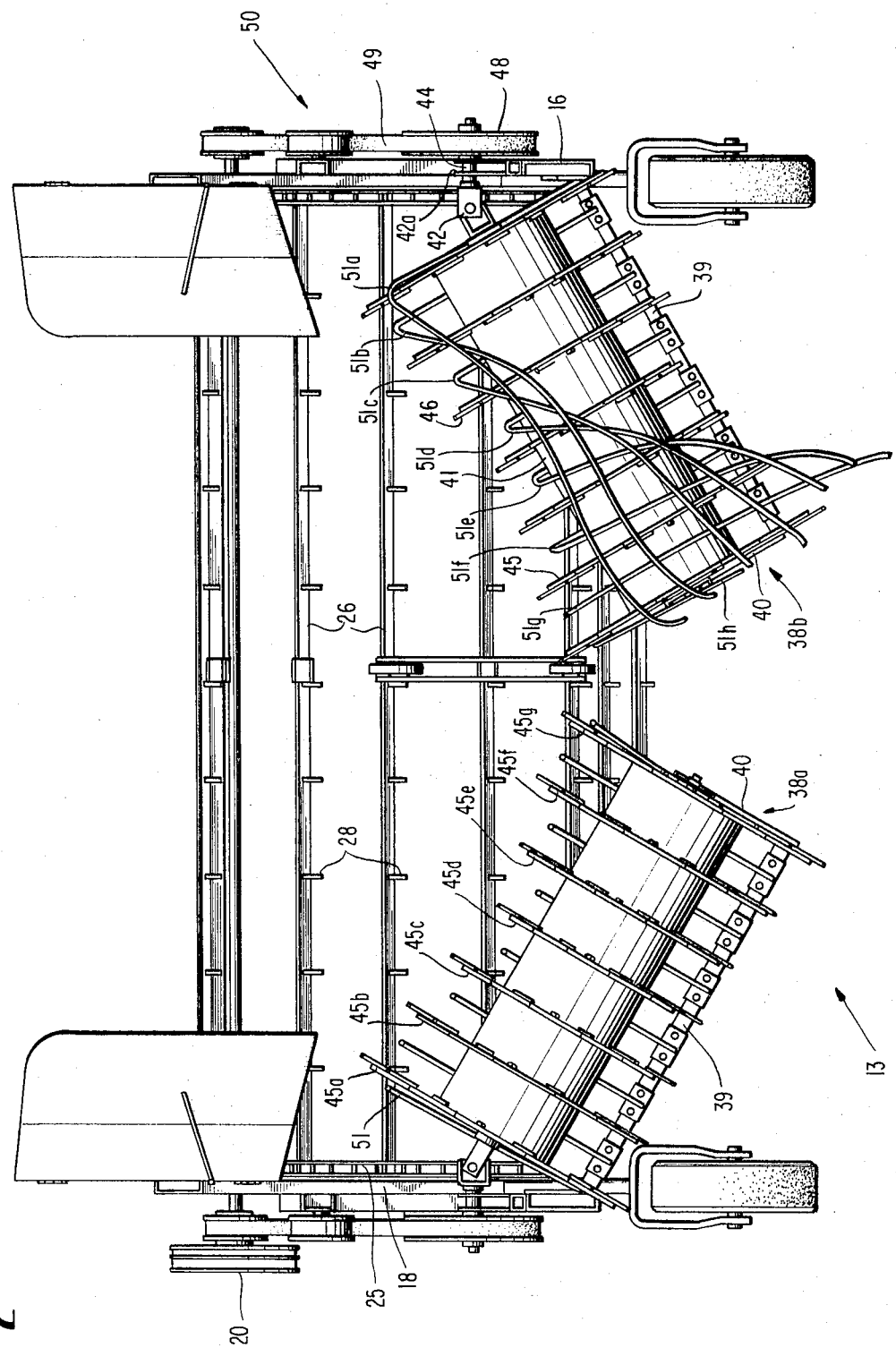

3,847,225

PEANUT HARVESTER

CROSS REFERENCE TO RELATED APPLICATION

This application is a continuation of application Ser. No. 175,591, filed Aug. 27, 1971, now abandoned, which was a continuation-in-part of application Ser. No. 29,137, filed Apr. 16, 1970, now U.S. Pat. No. 3,613,797, issued Oct. 19, 1971.

BACKGROUND OF THE INVENTION

In the process of harvesting peanuts the mature peanut laden plants are normally plowed from the ground, the dirt shaken from the plants, and the plants are stacked in wind rows for sunning and exposure to the atmosphere for the purpose of drying the roots and peanuts of the plants. Machinery has been developed to perform these basic functions and usually comprises a plow assembly pulled through the earth by a tractor, and a shaker or inclined conveyor mechanism for retrieving the unearthed plants and elevating and shaking the plants to remove the dirt from the roots and peanuts of the plants. When the plants leave the shaker, they are allowed to fall back to the earth where they are allowed to dry. Since it is desirable to invert the plants during the harvesting process various devices have been developed to invert the plants as they leave the shaker and fall to the ground. The inverting devices usually are expensive, unreliable, and some of the inverters require a change in the direction of movement of the plant over the harvester and are capable of handling only prescribed volumes of plants, with a smaller volume of plants tending to wrap around or become jammed in the moving parts of the system, and with larger volumes of plants frequently choking the system.

SUMMARY OF THE INVENTION

Briefly described, the present invention comprises a peanut harvester which functions to unearth peanut laden plants from adjacent crop rows in a field, shake dirt from the plants and deposit the plants generally in a single row of inverted plants, with the nuts and roots exposed. The apparatus includes a pair of plow assemblies spaced apart a distance corresponding to the spacing of adjacent crop rows of plants for unearthing the plants, a shaker or inclined conveyor mechanism for lifting and passing the plants in generally parallel separate paths in an upwardly inclined direction while shaking the dirt from the roots of plants, and an inverter connected to the rear of the shaker for receiving the plants in their paths and moving the plants generally in separate paths away from the shakers while rolling or twisting the plants along their direction of movement so that the foliage of the plants is rotated from generally above the plants down between the paths of the plants as the plants are passed by the inverter from the conveyor to the ground.

Thus, it is an object of this invention to provide a peanut harvester for inexpensively and expediently unearthing peanut plants, removing the dirt from the roots and peanuts of the plants, and depositing the plants on the ground in an inverted attitude.

Another object of this invention is to provide an inverter mechanism for connection to a shaker, wherein the inverter mechanism functions to receive peanut plants from the shaker and deposit the plants on the ground in an inverted attitude.

Other objects, features and advantages of the present invention will become apparent upon reading the following specification, when taken in conjunction with the accompanying drawing.

BRIEF DESCRIPTION OF THE DRAWING

FIG. 1 is a perspective view of the peanut harvester.

FIG. 2 is a rear view of the inverter and a portion of the shaker with the ends of the guide tines removed from the left inverter.

FIG. 3 is a detailed illustration of the upper end of the shaker and the inverter.

FIG. 4 is a schematic illustration of the movement of the plants as the harvester functions to plow, elevate and invert the plants from adjacent crop rows of plants.

DESCRIPTION OF A PREFERRED EMBODIMENT

Referring now in more detail to the drawing, in which like numerals represent like parts throughout the several views, FIG. 1 shows peanut harvester 10 which includes plow means 11, conveyor means 12 and inverter assembly 13. Plow means 11 includes a pair of spaced apart plow assemblies 15 mounted on the draw bar of framework 16 of the harvester, and plow assemblies 15 are spaced apart a distance corresponding to the spacing of adjacent plant rows of peanuts. The spacing of the plow assemblies 15 can be adjusted in the usual manner.

Conveyor means 12 comprises a conventional shaker or upwardly inclined conveyor having inclined side frame members 18 supported by framework 16, driving sheave 19 connected to the power takeoff of the harvester, driven sheave 20 at the upper end of the inclined side frame members, endless driving belt 21, upper driven sprockets 22, lower driven sprockets 24, endless conveyor chains 25 extending about sprockets 22 and 24, and a plurality of generally parallel spaced apart rattler bars 26 connected at their ends to conveyor chains 25. Rattler bar teeth 28 are connected to each rattler bar 26 at spaced intervals. The arrangement of conveyor means 12 is such that when driving sheave 19 is rotated by the power takeoff of the harvester, driving belt 21 rotates upper sheave 20, which in turn rotates the upper driven sprockets 22. The upper driven sprockets 22 cause conveyor chains 25 at the sides of the shaker to move rattler bars 26 up the upper inclined flight and down lower or return flight of rattler bars. The teeth 28 of the rattler bars 26 moving with the rattler bars around the lower driven sprockets 24 from the return flight of rattler bars retrieve the peanut plants which have been unearthed by plow means 11 from the ground and elevate and shake the plants as the rattler bars 26 move up the upper inclined flight.

Side fenders 30 confine the peanut plants to the conveyor, and the rear ends 31 of side fenders 30 are slanted inwardly toward the centerline of the conveyor so as to move the plants falling from the upper end of the conveyor closer to the centerline of the assembly. The rear ends 31 of the side fenders 30 can be pivoted on hinges 32 if desired, to adjust the deflection of the plants passing over the upper end of the conveyor and the upper ends of the fenders can be locked in the desired position by locking rods 34.

Inverter assembly 13 is connected to framework 16 behind conveyor means 12 and includes a pair of inverters 38a and 38b which are substantially identical in construction and extend generally inwardly of the harvester toward the centerline of the conveyor means. Each inverter 38a and 38b comprises a support bar 39 (FIG. 3) rigidly connected at one of its ends to framework 16 and extending in a downwardly inclined and slightly forward direction from its point of connection to framework 16, generally toward the centerline of the harvester. Bearing plate 40 is connected to the other end of support bar 39 and plant propelling means or rotatable drum 41 is rotatably supported at its inner end to bearing plate 40. The other end of rotatable drum 41 includes a universal joint 42 and drum drive shaft 44 is connected to the universal joint and is supported by support plate 45 on framework 16.

Rotatable drum 41 of each inverter 38a and 38b is cylindrical and a plurality of substantially parallel spaced wall members 45 which are generally of annular configuration are rigidly connected to the external surface of the rotatable drum. The wall members 45 at the middle portion of rotatable drum 41 are of smaller outside diameter than the wall members 45 at the ends of the rotatable drum, and the outside diameters of the wall members progressively increases from the middle toward the ends of the rotatable drum. As is illustrated in FIG. 3, wall members 45 are of generally annular configuration but include non-circular perimeters. A plurality of spokes 46 are rigidly connected to wall members 45 at spaced intervals about the perimeters of the wall members. Rotatable drum 41 normally rotates in the direction as indicated by arrow 47 and spokes 46 are inclined rearwardly with respect to the direction of rotation of drum 41. Spokes 46 of each wall member 45 are approximately of the same length, but the increasing outside diameter of the wall members from the middle of rotatable drum 41 toward its ends together with the generally even spacing of the spokes about the wall members 45 causes the outer ends of the spokes to form a hyperboloid or hour glass shape. Also, while the wall members 45 are positioned generally parallel to one another on each rotatable drum 41, and since the axis of each rotatable drum 41 is generally inclined downwardly from the sides of the harvester and inclined forwardly from its point of connection on framework 16, the planes of wall members 45 are sloped outwardly from top to bottom and inwardly from front to rear of the harvester.

The rotation of rotatable drums 41 of the inverters 38a and 38b is derived from sheaves 48 connected to drum drive shafts 44, and the sheaves 48 are driven by driving belts 49 which derive their power from the pulley assemblies 50 which inner-connect with upper driven sheave 20 of conveyor means 12.

Each inverter 38a and 38b includes a plurality of spaced guide rods 51 each connected at one end to its support bar 39 and extending in a curved upward direction around the forward and upper portions of its rotatable drum 41, extending generally rearwardly of the harvester from above the rotatable drums. The guide rods 51a at the upper ends of the rotatable drums 41 each curve upwardly over its rotatable drum generally parallel to upper wall 45a, then extends rearwardly of the harvester and curves inwardly toward the centerline of the harvester. Guide rods 51b each curve upwardly about its drum 41 from its support bar 39, extends generally between wall members 45a and 45b, also extends rearwardly of the harvester and generally curves toward its centerline. Guide rod 51b slopes downwardly more than guide rod 51a and terminates at a point generally below guide rod 51a. Likewise, guide rods 51c through 51g of each inverter each extends upwardly from its support bar 39 around the upper portion of its rotatable drum 41, between wall members 45b through 45g and then extends generally rearwardly, downwardly, and inwardly of the harvester and terminates with its end located progressively lower with respect to the ends of the previous guide rods. In addition, a guide rod 51h is connected to bearing plate 40 adjacent the lower wall member 45g and compliments the remaining guide rods.

The portions of the guide rods 51a through 51g passing around the upper curvature of rotatable drums 41 also generally conform to the hyperboloid or hour glass configuration of the perimeters of wall members 45 of the inverters and are generally located at a level corresponding to the peripheries of adjacent ones of the wall members 45. With this arrangement, the spokes 46 connected to wall members 45 protrude between guide rods 51a through 51g. When rotatable drums 41 are rotated, the spokes 46 will pass between portions of guide rods 51a through 51g which extend upwardly from support bars 39 and over their proportions of the rotatable drums 41. Since the guide rods 51a through 51g of each inverter extend rearwardly from the upper portions of rotatable drums 41, spokes 46 will move downwardly between the guide rods and eventually withdraw from the vicinity of the guide rods as they pass around the lower portion of rotatable drums 41. The arrangement is such that rotatable drums 41, their wall members 45 and their spokes 46 form rotatable driving members at the portions of guide rods 51a through 51g adjacent and below the upper end of conveyor means 12, and the portion of the guide rods of each inverter in this vicinity form an open, generally convex concave surface onto which the peanut plants fall. The portions of the guide rods extending rearwardly from the rotatable drums 41 form a twisted path for the purpose of guiding the peanut plants through paths extending rearwardly of the conveyor means 12 and rolling or twisting the peanut plants about their direction of movement away from conveyor means 12, so as to roll the foliage of the plants inwardly between the paths of movement of the plants while rolling the roots and nuts of the plants upwardly, thereby causing the plants to be deposited upon the ground in an inverted attitude.

OPERATION

When the harvester is connected to a tractor, it is moved forwardly along adjacent rows of peanut plants with its plow means 11 passing beneath the surface of the ground to unearth the peanut plants from the adjacent rows. As is illustrated in FIG. 4, the rows of plants tend to move as a pair of ribbons of plants 60 and 61 from the earth as they are unearthed by the plows. Usually the ribbons 60 and 61 will be maintained separate from each other by penetrating the earth between the adjacent rows of plants and outside the adjacent rows of plants with coulters or cutting discs (not shown) to cut the overlapping vines and roots of the plants. Of course, when a variety of plant is being harvested which does not have vines or roots which tend to overlap adjacent rows of plants, the use of the coulters may not be necessary to keep the plants in adjacent rows separated from each other.

The driving sheave 19 of conveyor means 12 derives its power from the power takeoff shaft of the tractor and rotates driven sheave 20 by means of continuous driving belt 21. Driven sheave 20 causes the upper drive sprockets 22 to rotate causing conveyor chains 25 to move. The rattler bars 26 connected at their ends to conveyor chains 25 follow the movement of the conveyor chains and move up the upper inclined flight and then down the lower return flight of the conveyor means. The teeth 28 of the rattler bars 26 tend to retrieve the plants unearthed by the plow means 11 as they pass about the lower driven sprockets 24, and the plants are carried with the rattler bars 26 up the incline of conveyor means 12. As the plants move up the conveyor means they are vibrated and shaken and the dirt clinging to the roots and peanuts of the plants tends to be jarred from the plants and passed through the generally open conveyor means to the ground.

As the peanut plants reach the upper end of the conveyor means 12 they tend to fall from the upper end of the conveyor means down onto inverter assembly 13, where they fall against the generally concave arrangement of guide rods 51a through 51h at the plant infeed area of the inverters 38a and 38b. Rotatable drums 41 of inverters 38a and 38b are rotated through their sheave and belt arrangement 48 and 49 in the direction indicated by arrow 48 (FIG. 3), and the spokes 46 of the inverters protrude through and pass along the lengths of guide rods 51a through 51h and urge the peanut plants along the lengths of the guide rods in a rearward direction away from conveyor means 12. As the plants fall against the guide rods, the impact of the plants against the guide rods causes a substantial amount of the dirt clinging to the root, nuts, etc. of the plant to be dislodged from the plant and fall downwardly away from the plant. Moreover, the relatively stationary guide rods 51a through 51h together with the rapidly moving spokes 46 tend to separate and spread the roots and nuts of the plants when received upon the inverter, and the angles between the axes of rotation of the rotatable drums 41 and the axes of rotation of their driving shafts 44 through universal joints 42, which is approximately 30°, causes a surging movement in rotatable drums 41 of plus and minus approximately 15 percent of the relatively constant rotational velocity of driving shafts 44. This spreading of the plants and the surging of the drums causes a substantial amount of the dirt remaining in the plants to be loosened and separated from the plants. The dirt leaving the plants at this point is free to fall downwardly through guide rods 51a through 51h toward the ground, and wall members 45 tend to guide the falling dirt around rotatable drum 41 and down along the outwardly inclined surfaces of the wall members away from the centerline of the harvester toward the ground.

As the peanut plants are propelled rearwardly along the lengths of the guide rods 51a through 51h by spokes 46 and the peripheral edges of wall members 45, they are propelled faster and move vigorously by the spokes and wall members positioned at the ends of the rotatable drums than they are by the wall members and spokes positioned at the middle portions of the drums since the wider outside diameter of the end wall members and spokes results in a faster peripheral velocity of the wall members and spokes at the ends of the rotatable drum. Thus, the ribbons of plants passing along guide rods 51a through 51h are propelled more rapidly at the edges of the ribbons than they are at the centers of the ribbons.

As is illustrated in FIG. 4, the ribbons of plants move up an incline 60a and 61a until they reach the upper end of conveyor means 12, whereupon they move generally in a downward direction at 60b and 61b until they fall against inverters 38a and 38b whereupon they are propelled rearwardly along the guide rods and twisted inwardly as at 60c and 61c until they are allowed to fall to the ground. As the plants move rearwardly along the lengths of the guide rods, they are twisted as they follow the guide rods because of the arrangement of the free ends of the guide rods, and the twisting motion is generally such that the plants are twisted along their direction of movement, with the upper foliage tending to pass between the adjacent paths down toward the ground, so that the plants are deposited upon the ground in an inverted attitude. It will be noted that as the ribbons of plants move through the portions 60c and 61c of the paths, the twisted configuration of the path requires that the outside edges of the paths move further than the center portions of the paths. Thus, the hyperboloid or hour glass configuration of the driving members of the inverters imparts the proper velocities to the plant in order that the plants make a smooth transition between the conveyor means and the ground.

While this invention has been described in detail with particular reference to preferred embodiments thereof, it will be understood that variations and modifications can be effected within the spirit and scope of the invention as described hereinbefore and as defined in the appended claims.

We claim:

1. An apparatus for harvesting peanuts including plow means movable forwardly through the ground to unearth peanut plants and an inclined conveyor means behind said plow means for retrieving the plants from the ground and moving the plants in an upward direction and dropping the plants, the combination therewith of inverting apparatus positioned behind and below the upper end of said conveyor means for catching and inverting the plants dropped from said conveyor means comprising a pair of plant propelling means each rotatable about an axis extending laterally of the direction of movement of said apparatus and including a plurality of spaced wall members with noncircular peripheries with the peripheries of said spaced wall members generally forming a hyperboloid as each plant propelling means rotates, a plurality of spaced rods extending generally rearwardly of said conveyor means with portions thereof adjacent said conveyor means extending around the upper portion of each of said plant propelling means and between and below the upper peripheries of said spaced wall members and extending rearwardly from each of said plant propelling means and forming a pair of twisted paths for twisting the plants over and inwardly about their directions of movement away from the conveyor means and rolling the foliage of the plants inwardly between the paths of movement of the plants.

2. An apparatus for harvesting two adjacent crop rows of peanut plants or the like including an inclined conveyor means for retrieving peanut plants at its lower end from the ground, elevating the plants, and dropping the plants from its upper end in generally separate paths, the combination therewith of inverting apparatus positioned behind and below the upper end of said conveyor means comprising two groups of plant guide rods extending generally rearwardly from said conveyor means on opposite sides of the centerline of said conveyor means with each group of guide rods positioned to receive the plants in each path of plants, and a plant propelling means positioned below each group of guide rods and comprising spaced parallel rotatable wall members protruding upwardly between adjacent ones of said guide rods and arranged to urge the plants rearwardly along the guide rods at a faster velocity at the outer edges of each path of plants than at the center of the paths of the plants, said guide rods being arranged to twist the plants about their directions of movement to invert the plants.

3. A peanut harvester comprising plow means for unearthing peanut plants from adjacent rows of plants, an upwardly inclined conveyor means movable in a forward direction with said plow means for retrieving plants from the plow means and elevating the plants and maintaining the plants in adjacent ribbons of plants, an inverter assembly positioned behind and below the upper end of said upwardly inclined conveyor means and arranged to receive the ribbons of plants dropped from the upper end of said conveyor means and to invert the plants, said inverter assembly comprising a pair of plant propelling means each including a plurality of wall members in spaced apart approximately parallel open relationship with respect to one another with non-circular outer peripheries and rotatable about an axis extending across the forward direction of movement of said conveyor means, the wall members at the sides of each plant propelling means being of large diameter and positioned to receive the outside edge portions of the ribbons of plants dropped from the upper end of the conveyor means and the wall members at the middle portions of each plant propelling means being of smaller diameter and positioned to receive the middle portions of the ribbons of plants dropped from the upper end of the conveyor means, a plurality of spaced guide rods extending from between said conveyor means and said plant propelling means generally over each of said plant propelling means and generally rearwardly and downwardly from above said plant propelling means with a guide rod extending between adjacent ones of said wall members and with the upper peripheries of said wall members protruding up between adjacent ones of said guide rods, and said plurality of spaced guide rods forming a twisted path rearwardly and downwardly from said plant propelling means, whereby plants are unearthed by the plow means, retrieved and elevated in ribbons of plants by the conveyor means, the ribbons of plants dropped from the upper end of the conveyor means onto the plant propelling means and the guide rods, propelled by the propelling means along the guide rods at a greater velocity at the outside edge portions of the ribbons and guided by the guide rods along a twisted path away from the conveyor means and deposited in a generally roots-up attitude on the ground.

4. Apparatus for harvesting peanuts or the like comprising an inclined conveyor means movable along two generally parallel rows of plants for elevating the plants and shaking dirt from the plants, and inverting means positioned behind and below the upper end of said conveyor means for receiving the plants from the upper end of said conveyor means, said inverting means comprising a pair of similar inverter assemblies each comprising plant propelling means and plant guide means, each of said plant propelling means comprising a substantially cylindrical drum member rotatable about its longitudinal axis with a plurality of substantially parallel spaced apart wall members protruding from the curved surface of said drum member and oriented approximately normal to the axis of rotation of said drum member, and means for rotating said drum member and said wall members, and said plant guide means comprising a plurality of guide rods extending from positions generally between said drum member and said conveyor means upwardly and curved over said drum member between the planes of said wall members and below the upper periphery of said wall members and extending rearwardly and downwardly from said drum member, whereby the plants received on the inverting means are received on the guide rods and propelled rearwardly along the guide rods by the plant propelling means.

5. A method of harvesting peanuts or the like comprising:
unearthing plants in adjacent crop rows,
moving the plants from adjacent crop rows up an inclined conveyor means while maintaining the crops from each row as a ribbon of plants,
dropping the ribbons of plants downwardly from the upper end of the inclined conveyor means to an inverter assembly, propelling the outside edge portion of each ribbon, with the inverter assembly, at a rate of speed greater than the center portion of each ribbon,
guiding the ribbons of plants as the ribbons of plants move away from the inclined conveyor means so as to twist the ribbons of plants along their directions of movement with the faster moving outside edge portions of each of the ribbons of plants moving over its respective ribbon and then approximately between the adjacent ribbons of plants, and
depositing the ribbons of plants on the ground in an inverted attitude.

* * * * *

UNITED STATES PATENT OFFICE
CERTIFICATE OF CORRECTION

Patent No. 3,847,225            Dated November 12, 1974

Inventor(s) Carroll J. Whitfield and Jack C. Whitesides

It is certified that error appears in the above-identified patent and that said Letters Patent are hereby corrected as shown below:

The term of the patent grant extending beyond October 19, 1988, the expiration date of U.S. Patent 3,613,797, issued October 19, 1971, or any reissue thereof, is disclaimed.

Signed and sealed this 11th day of March 1975.

(SEAL)
Attest:

RUTH C. MASON
Attesting Officer

C. MARSHALL DANN
Commissioner of Patents
and Trademarks